United States Patent
Davies

(10) Patent No.: US 6,540,085 B1
(45) Date of Patent: Apr. 1, 2003

(54) REUSABLE PACKAGING

(76) Inventor: Heather J. Davies, 19 Paddock Lane, Kettleshulme (GB), SK12 7RD (*) Notice: Subject to any disclaimer, the term of this patent is extended or adjusted under 35 U.S.C. 154(b) by 0 days.

(21) Appl. No.: 09/529,238

(22) PCT Filed: Oct. 8, 1998

(86) PCT No.: PCT/GB98/03005
§ 371 (c)(1),
(2), (4) Date: Jun. 7, 2000

(87) PCT Pub. No.: WO99/19224
PCT Pub. Date: Apr. 22, 1999

(30) Foreign Application Priority Data

Oct. 9, 1997 (GB) .............................................. 9721423

(51) Int. Cl.$^7$ .............................................. B65D 19/00
(52) U.S. Cl. ........................................ 206/597; 150/154
(58) Field of Search ................................ 206/597, 497; 190/194, 166, 165; 410/97; 296/100.01; 105/377.01

(56) References Cited

U.S. PATENT DOCUMENTS

| 2,455,237 | A | * | 11/1948 | Davis .......................... 410/118 |
| 4,163,768 | A | * | 8/1979 | Stephens ..................... 264/163 |
| 4,226,327 | A | * | 10/1980 | Ballard ........................ 206/320 |
| 4,244,411 | A | * | 1/1981 | Karlstrom et al. .......... 206/600 |
| 5,050,924 | A | * | 9/1991 | Hansen ........................ 296/100 |
| 5,197,580 | A | * | 3/1993 | Berman et al. ............. 190/107 |
| 5,452,973 | A | * | 9/1995 | Arvin .......................... 410/118 |
| 5,944,213 | A | * | 8/1999 | Alicca et al. ................ 220/287 |
| 6,061,969 | A | * | 5/2000 | Leary .......................... 52/2.11 |
| 6,070,422 | A | * | 6/2000 | Alvenes ....................... 165/46 |
| 6,253,915 | B1 | * | 7/2001 | Mesica et al. .............. 206/317 |

* cited by examiner

Primary Examiner—Shian Luong
(74) Attorney, Agent, or Firm—Bernhard P Molldrem Jr.

(57) ABSTRACT

Reusable bulk packaging comprises a plastics bag having an opening which is closable by means of a zip fastener attached to the body of the bag, typically by means of an adhesive or by welding. Exemplary packaging is a flexible intermediate bulk container or a pallet cover (1). The plastics bag may be made out of bubble film, optionally laminated to aluminium foil.

19 Claims, 4 Drawing Sheets

REUSABLE PACKAGING

This invention relates to containers and packaging, and is particularly concerned with the provision of containers and packaging which can be re-used. In one aspect the invention relates to containers having a closable opening, including those used commercially for the storage and transportation of a wide variety of products. A particular aspect of this invention is concerned with such a closable plastics container which, because of the nature of the sealing device, is reusable on many occasions.

Flexible containers are widely used in industry for the transport and storage of solid products. In particular, the use of plastics bags or containers for the storage and transportation of materials has found widespread application in industry because of the strength, flexibility, lightness and inert nature of such containers, and the fact that they are relatively inexpensive to produce.

Specifically, plastics bags find application as flexible intermediate bulk containers (FIBCs) and as liners for rigid intermediate bulk containers (RIBCs). FIBCs and RIBCs normally have a capacity of up to 3000 liters and more typically have a capacity of about 1000 liters. Depending upon the density of the contents, therefore, a 1000 liter FIBC may carry a load of up to about 1500 kg. Such containers are used for the storage and transportation of materials in powder, granule or paste form, for example chemical raw materials and foodstuffs. FIBCs may have an inner liner and do not require further packaging. FIBCs are typically designed to be lifted from above using integral, detachable or permanently attached lifting devices.

FIBCs are generally comprised of plastics such as polyalkenes, typically polyethylene or polypropylene, or polyesters, for example; alternatively they may be made of woven fabric or of paper. One class of container is made using sheet plastics laminate material. The containers are typically reinforced, for example by a fabric or alternatively by fibres, and may comprise laminates of such reinforced or non-reinforced polymers with aluminium; optionally, further materials may also be incorporated. One exemplary material is a cross-laminated HDPE film sold under the registered trade mark Valéron by Van Leer Flexible Packaging, PO Box 88, B 2910 Essen, Belgium.

Plastics bags also find application for somewhat smaller bulk containers, for example with a capacity of about 25 liters. One 25 liter flexible plastics container has a paper lining and is used for the transport and storage of dry foodstuffs, especially rice.

Another type of flexible container is a pallet cover, which is typically heat-sealed plastics sheeting enclosing a pallet and one or more articles loaded on the pallet. As the skilled reader will appreciate, there are numerous other containers which are formed from flexible packaging material, especially sheet plastics material.

Prior to the transportation of goods in containers, it will be appreciated that sealing of the containers is required in order to protect the goods and/or prevent loss through spillage or leakage of materials in transit. Most commonly, sealing is achieved by the application of an heat and, to this end, the incorporation of a reliable heatseal medium in the material of the containers ensures that an effective seal may be obtained. Whilst such means ensure that high efficiency of sealing is achieved, once the seal is broken, for example following transportation, and the contents of the container have been removed, re-use is not possible, and the used container has to be disposed of in a suitable manner.

It has therefore been desired to provide flexible containers, especially plastics bags, which are for the transport of bulk goods and which are both sealable and re-usable. A perceived problem in achieving this aim has been the incomparability of known fasteners with such plastics bags (and other flexible containers) in view of the heavy loads carried by bulk containers. For example, very small bags are known to be sealed using mating profiles or zips, but both these types of fastener have been perceived as offering inadequate strength when placed in a bulk container.

Those very small plastics bags which do incorporate zips use stitching to attach the zip to the plastics sheeting of the bag. Whilst the stitching provides strength and has proved itself as a reliable attachment means, it is relatively costly and inconvenient to provide, such that an even more ideal re-usable fastener would be attached by means which would be relatively inexpensive and convenient to attach but nonetheless provide strength and durability.

It would therefore be desirable to provide a resealable flexible bulk container especially a resealable flexible plastics bulk container. It is an objective of a preferred embodiment of the present invention to provide a plastics container in the form of a plastics bag which may be used as an FIBC or as a liner in an RIBC, and which may be reused on several occasions.

It would also be desirable to provide a plastics bag provided with a robust re-usable closure capable of being attached to the body of the bag by a means more convenient than stitching.

According to one embodiment of the present invention, there is provided a flexible bulk container, especially a flexible plastics bulk container, having an opening which is closable by means of a zip fastener. The container in some preferred embodiments is an FIBC or a liner for an RIBC. In other preferred embodiments, the container is a pallet cover or an order picking container.

According to another embodiment of the present invention, there is provided a plastics bag, which may be a bulk container, having an opening which is closable by means of a zip fastener attached to the body of the bag by means of an adhesive or by welding. The bag is typically comprised in a bulk container having a capacity of about 25 liters or more, e.g. 500 liters or more. In one class of embodiments the bag is an FIBC or a liner for an RIBC having in either case a capacity of about 1000 liters, or it may be bigger. In another class of embodiments the bag is a pallet cover.

By the use of an adhesive or welding in this way it is possible conveniently to adhere the plastics backing of the zip mechanism to the surface of the plastics bag at either side of the opening therein. Thus, the plastics bags of this aspect of the invention are very easy to produce and operate and, once emptied of their initial contents and cleaned internally, the bags are available for re-use, leading to further cost savings in addition to the environmental benefits which accrue as a result of the reduction in waste.

In all embodiments of the invention the zip preferably comprises plastics material the same as or similar to that of the bag, in order that compatibility with the proposed contents may be ensured. Thus, the surfaces of the zip preferably comprise a plastics material having compatability properties similar to those of the bag. In those embodiments of the invention which do not require the zip to be glued to the container or bag, as in the case of intermediate bulk containers, it may be stitched to the body of the container or bag.

The zip may extend across the top of the flexible container or bag, or it may be located in a sidewall thereof, as is preferred in the case of pallet covers, FIBCs and RIBC liners. Thus, the invention includes pallet covers, FIBCs and RIBC liners which are made using plastics sheet material (which may be reinforced and/or laminated) and comprise in a sidewall thereof an opening provided with a zip fastener, which is suitably in an upright orientation in use and may have a length of, for example, 25–50 cm, e.g. about 30 cm.

The body of the flexible container may comprise any plastics material known for the construction of such containers. Thus, the plastics material may be reinforced and/or be laminated; such laminates may include non-plastics materials (notably metal foil, especially aluminium foil) as well as plastics materials. In some classes of container, an outer layer comprising flexible plastics film material, e.g. a reinforced polyalkane or polyester, is lined by an inner layer of, for example, paper. Of course, such reinforced polyalkane or polyester materials do not have to be lined. The invention includes containers suitable for providing thermal insulation and comprising bubble film optionally laminated to a metal foil material.

The adhesive utilised in some embodiments of the present invention may be applied as an adhesive strip, allowing the plastics of the zip fastener to be directly attached to the surface of the plastics bag. Most conveniently, the adhesive strip is in the form of a double-sided adhesive strip, which may conveniently be applied such that the zip fastener becomes affixed to the outer surface of the plastics bag. Alternatively, however, the zip may be attached to the inner surface of said bag. By this use of an adhesive it is possible to avoid the necessity to provide paper linings which were a feature of some prior art flexible containers and facilitated the attachment of plastics surfaces to each other with the assistance of various glues and other adhesives.

As has already been stated, the containers and bags of the invention may be in the form of pallet covers. The invention provides in a further aspect a reusable flexible pallet cover characterised in that it has, in use, an open bottom and in that, usually, it comprises a releasable fastener member for directly or indirectly holding the pallet cover to a pallet. Preferred embodiments are set forth in the claims.

The invention also includes a package comprising a pallet having one or more articles loaded thereon and, covering the articles, a flexible pallet cover open at the bottom and seated on or at least partially surrounding the pallet, the pallet cover being directly or indirectly held to the pallet by a releasable fastener member. Again, preferred embodiments are set forth in the claims.

Preferred pallet covers of the invention, as well as other containers, may be made from flexible packaging comprising cruciform sheet material. Such packaging forms a further aspect of the invention and has arms whose adjacent side margins are provided with respective members of a zip fastener for zipping the margins together. The zip fastener members are suitably adhered or welded to the sheet material.

The sheet material may comprise bubble film optionally laminated to a metal foil material. The invention also includes zippable bubble film packaging, for example containers, in other configurations.

Preferred embodiments of the cruciform packaging and the zippable bubble film packaging are set forth in the claims.

The present invention is further described by way of example only with reference to the accompanying drawings, in which.

Figure 1:
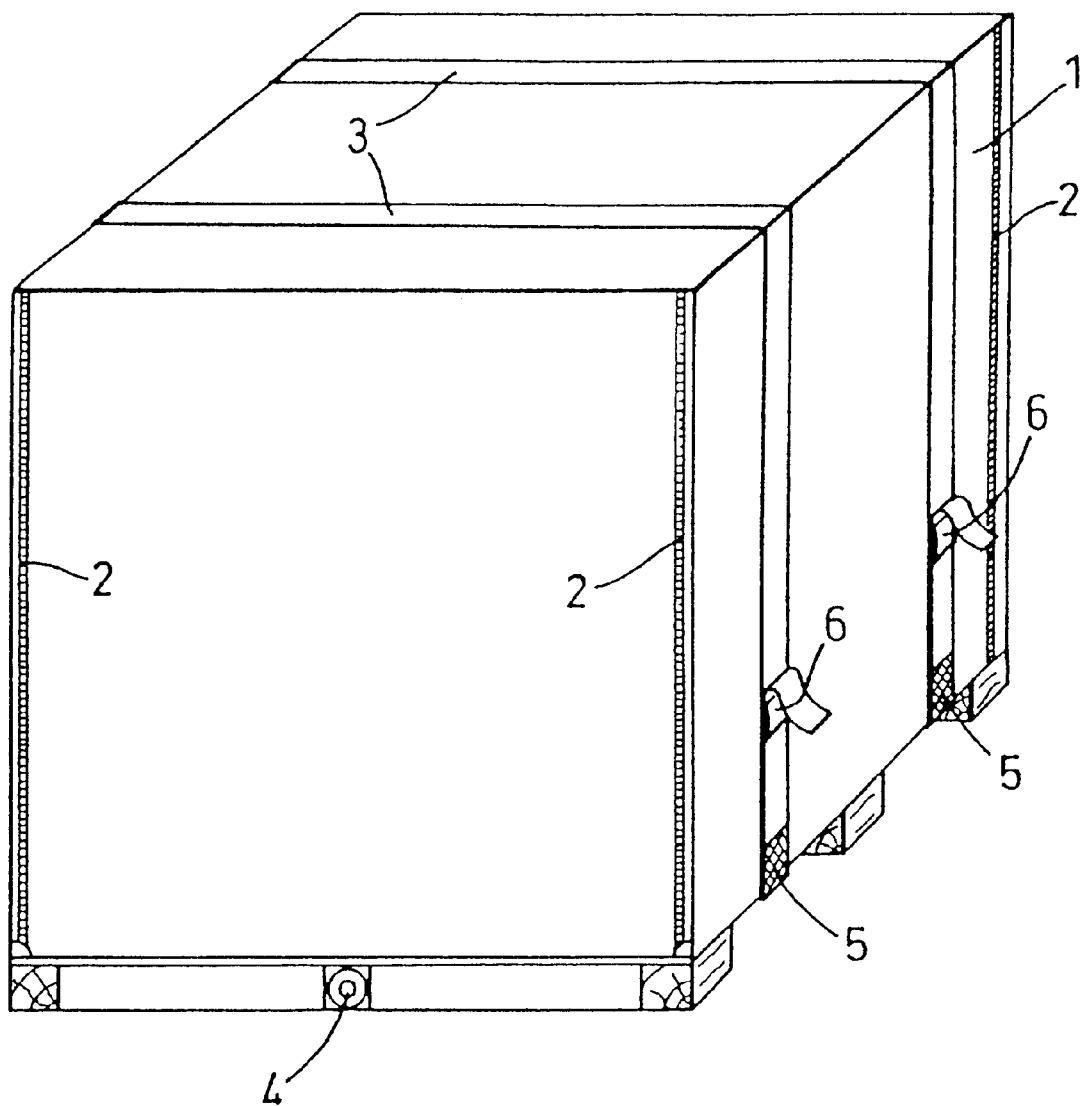
FIG. 1 illustrates a bag or container of the invention embodied as a first design of pallet cover.

FIG. 1, therefore, illustrates a flexible bulk container 1 (in this case, a pallet cover) having an opening which is closed by a zip fastener 2. The illustrated container has a zip fastener 2 at each of its far corners.

FIG. 1 also serves to illustrate a plastics bag 1 (ie pallet cover) having an opening closed by means of a zip fastener attached to the body of the bag by means of an adhesive or welding.

The pallet cover of FIG. 1 does not strictly require its side wall to contain an opening closable by a zip fastener or alternative closure device. FIG. 1 therefore serves additionally to illustrate a reusable flexible pallet cover 1 which has an open bottom, and usually, a releasable fastener member (strap 3) for indirectly or directly holding the pallet cover 1 to a pallet 4.

Looking at FIG. 1 in more detail, therefore it shows a flexible pallet cover 1, representing a container or bag of the invention. A zip fastener 2 is provided at each corner of the pallet cover but, of course, a greater or lesser number of zip fasteners may be provided. The pallet cover 1 belongs to a class of flexible bulk containers having a zip 2 located in the container side wall. As shown, the zip 2 serves to close an opening which in use constitutes an upward slit which may, if desired, be at an angle to the vertical.

In some aspects of the invention, the openings which are closeable by the zip fasteners 2 may dispensed with or, alternatively, the one or more openings may be opened and closed by an alternative closure device, for example a rope or the like which can be laced through holes defined in marginal portions of the pallet cover on each side of the slit or opening.

The zip fastener(s) 2 may be stitched to the body of the pallet cover 1 but is/are more preferably secured thereto by adhesive or by welding, as is described in more detail below and essential in one aspect of the invention.

The pallet cover 1 is held directly or indirectly to the pallet 4 by a releasable fastening member and, more particularly, by one or more straps 3, which have a free end which can be coupled to the pallet or to a strap member extending under the bottom of the pallet. The bottom strap member may be part of the strap 3 or a separate length of strapping. If separate bottom and top straps are used, the two ends of one are usually attachable to the two ends of the other, as for example by buckles or clips. The strap 3 may therefore have at each end one member of a plural member securing device (eg buckle), whether for securing to a bottom strap or to a securing device attached to the pallet (not shown). In the illustrated embodiment, however, the strap 3 is provided at its free end with a hook-profile cleat 5 which extends under the pallet and, usually, has a serrated end which serves to grasp the wood of the pallet when the strap 3 is under tension. The cleat 5 may be made of metal or a suitable plastics material.

The strap 3 is desirably provided with a tension adjustment device such as, for example, a tensioning buckle 6.

A plurality of fastening members may be provided. For example, it is convenient to provide two straps 3 which are spaced from one another and at least approximately in parallel, as shown. Additionally or alternatively to providing at least a second parallel strap, one or more crosswise straps may be provided.

The straps 3 are desirably secured to the body of the pallet cover, for example, by stitching adhesive or welding.

The bags and containers of the invention are normally made out of plastics sheet material, which may be reinforced and/or be laminated. For example, a pallet cover 1 may be made from cross-laminated HDPE film such as that sold under the trade mark Valeron, for example. Alternatively, there may be used a cross-laminated LDPE film (eg that sold under the trade mark Valcross) or a polyester film. In other preferred embodiments, there are used plastics/metal foil (especially aluminium foil) laminates, for example cross-laminated LDPE/aluminium foil laminate optionally incorporating polyester; also suitable are aluminium barrier foils which are polyester-aluminium-LDPE coating-HDPE laminates such as those sold under the trade mark Valsem 527 (Barrier Technology Limited; Salford, Manchester M5 2GL, UK).

It has been found that bags or containers, eg pallet covers, with excellent thermal insulation may be made from bubble film, especially bubble film laminated to metal foil, more especially aluminium foil. Zip fasteners can be welded or adhered to such laminates based on bubble film and foil.

The zip fasteners incorporated in the bags and containers of the invention suitably comprise mating zip elements stitched to "wings" made of plastics material, especially a film containing cross-laminated polyethylene as described in the preceding paragraph.

The "wings" of the fastener are typically glued or, more preferably, welded to the bag or container. To facilitate welding of polyethylene-based films, one or both of the zip "wings" or the bag/container material will in practice be coated with a heat-seal coating, suitably that sold by Du Pont under the trade mark Surlyn.

Figure 2:
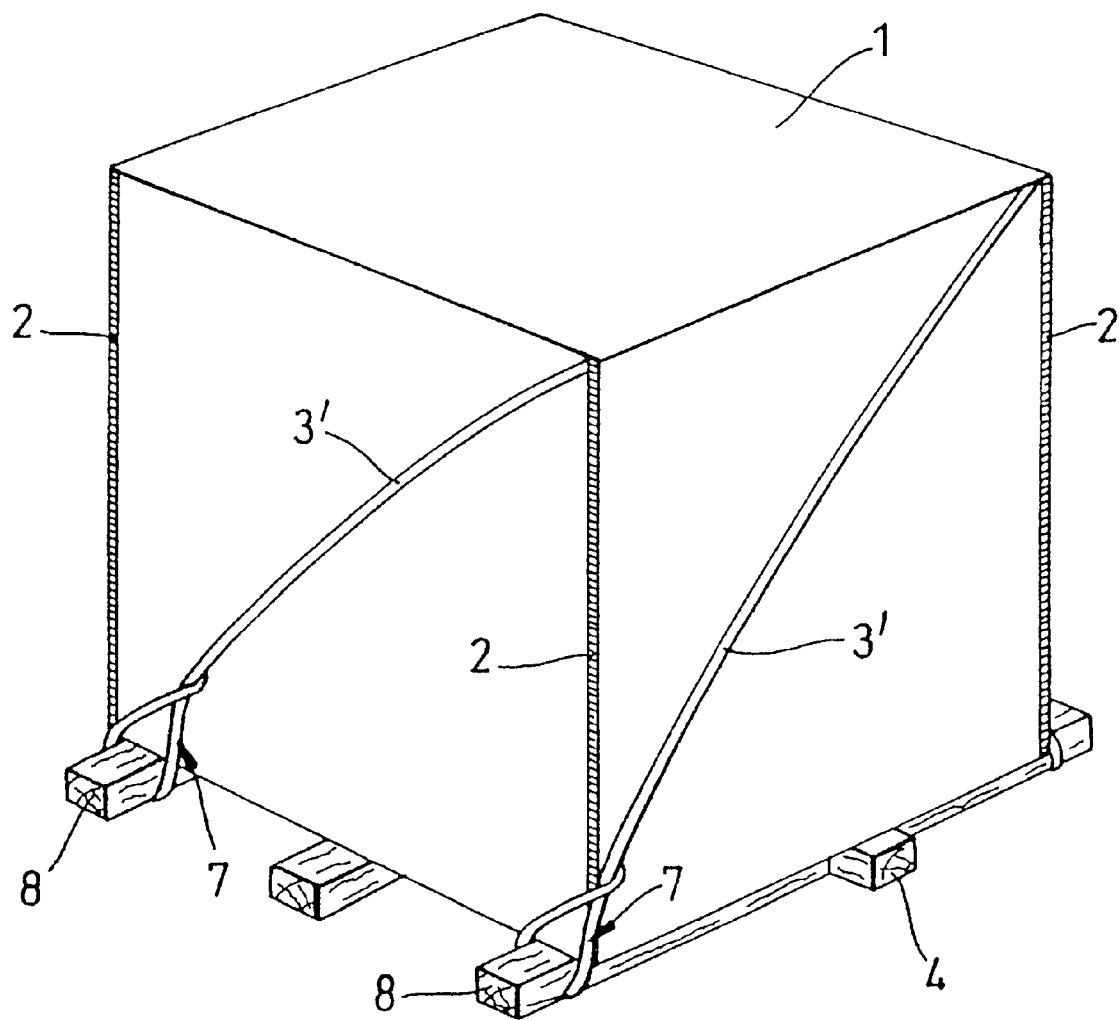
FIG. 2 illustrates a bag or container of the invention embodied as a second design of pallet cover.

FIG. 2 illustrates a second design of pallet cover which embodies a zipped bag or container of the invention. The Figure shows a pallet cover 1 incorporating one or more zip fasteners 2 (which may be dispensed with in some aspects of the invention) and seated on a pallet 4. A plurality of straps 3' releasably hold the pallet cover 1 to the pallet, for example by placing loops 7 at the free ends of the straps 3' around exposed ends 8 of pallet planks. The top ends of the straps are directly or indirectly secured to the pallet cover 1, for example by stitching. FIG. 2, therefore, illustrates a pallet cover which comprises a plurality of releasable fastening members which extend in a direction having a sideways component to an attachment point.

In the illustrated embodiment, the straps 3' extend in a diagonal direction, in effect partially wrapping round the pallet cover 1.

Figure 3:
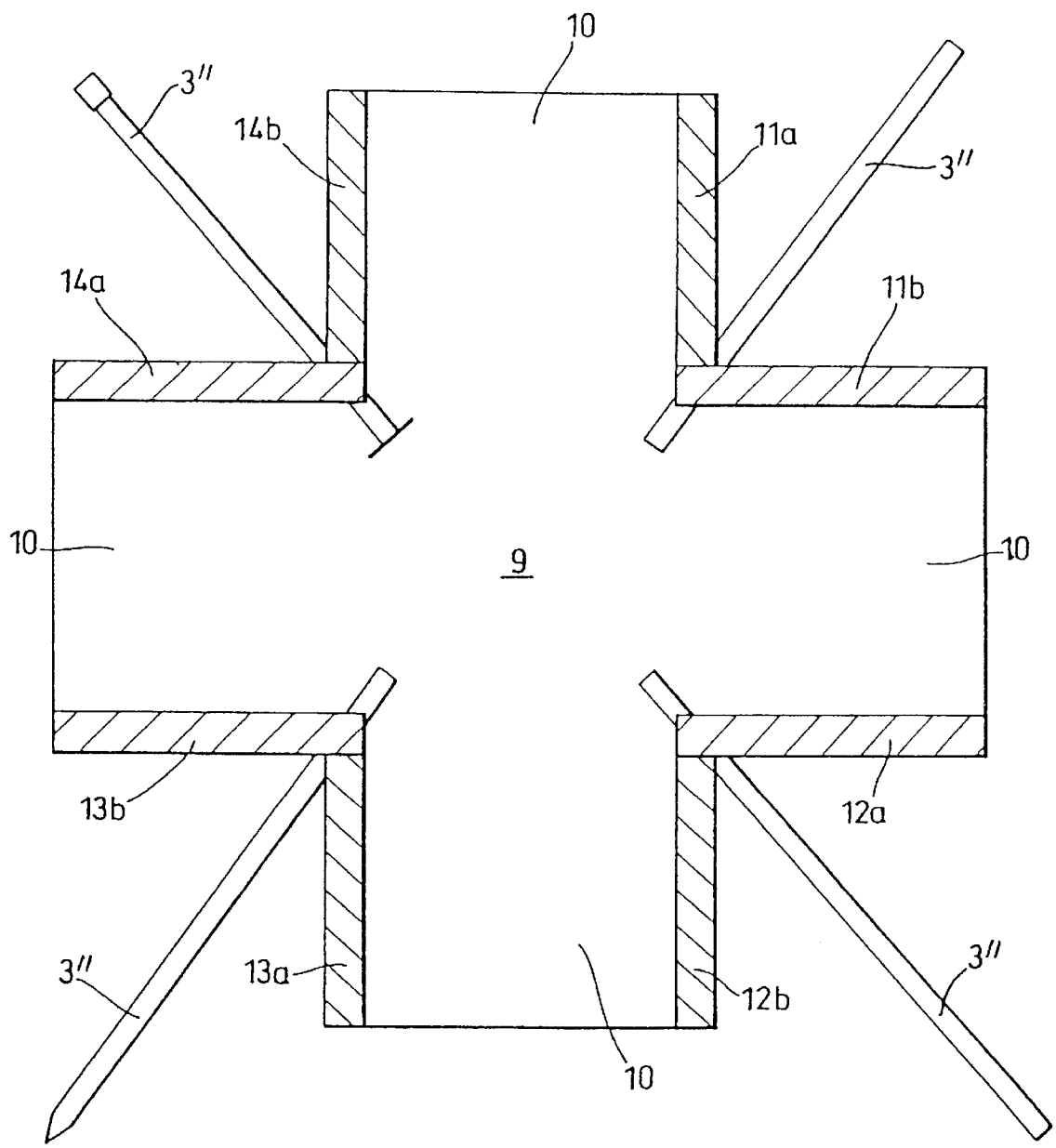
FIG. 3 illustrates cruciform packaging which may be zipped up to form a pallet cover or order picking bag embodying the invention.

FIG. 3 illustrates flexible packaging suitable for use as a pallet cover of the invention but also useful for other functions. The Figure shows cruciform sheet material 9 (eg made of plastics as described above in relation to FIG. 1) having four arms 10.

Adjacent side margins 11a, 11b, 12a, 12b, 13a, 13b, 14a, 14b of the arms 10 are provided with respective members of a zip fastener for zipping adjacent margins together. For example, plastics "wings" of a zip fastener may be welded or adhered to the side margins. Straps 3" or other releasable fastening means may be provided, if the packaging is to form a pallet cover.

Packaging which is intended for use as a pallet cover must be suitably designed to match the pallet size. Thus standard British pallets have dimensions of 1.1×1.1 m whereas most other European pallets are 1.2×1.2 m.

Generally, therefore, pallet covers are representative of those bags/containers of the invention having a volume of at least 1000 liters.

The packaging shown in FIG. 3 may be used as an order-picking bag: articles packed in a zipped-up bag can be picked in order from the top of the bag. Variants of such bags may have a number of zip fasteners other than 4.

The packaging shown in FIG. 3 can be made of a bubble film material to form insulated containers/packaging useful not only as pallet covers but also for other applications. In modifications of the illustrated packaging, material is provided to form an insulated closure for the mouth defined by the arms of the cruciform packaging. Thus, one the arms 10 may be extended to provide a flap for closing the mouth and desirably securable to the edges of the mouth, for example by zip fasteners or hook and fibre fasteners of the type sold under the trade mark Velcro; alternatively, two opposed arms may be extended, for example. The invention accordingly includes cruciform packaging of which not all the arms are equal in length as well as such packaging in which the arms are of equal length.

Figure 4:
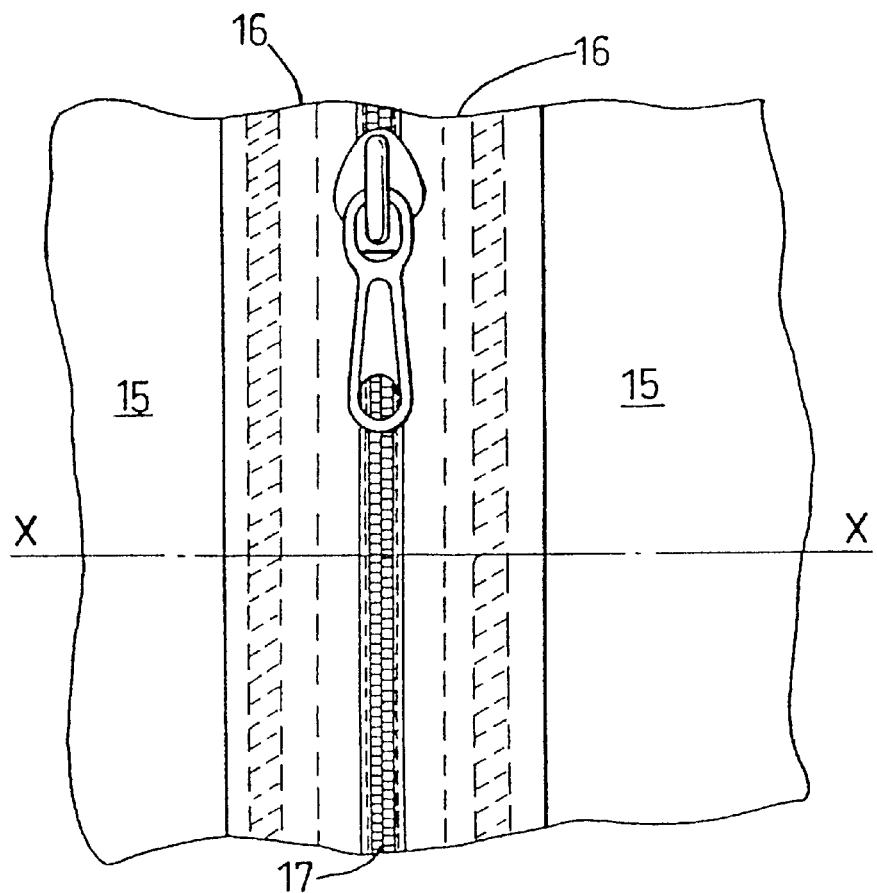
FIG. 4 is an enlarged partial elevation of packaging incorporating a zip.
Figure 5:
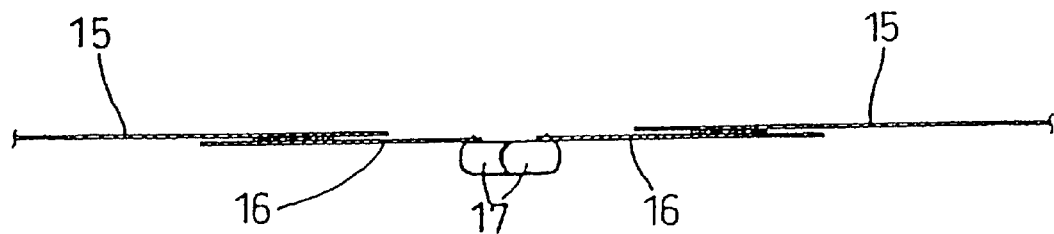
FIG. 5 is a cross section along line X—X of FIG. 4.

FIG. 4 shows in elevation a portion of an article made in accordance with the invention, for example, packaging, a bag or a container. The article comprises flexible plastics material 15, for example LDPE sheeting (in other embodiments the flexible plastics material is a polyethylene/aluminium foil laminate or bubble film), to which are glued or, preferably, welded the wings 16 of a zip fastener, as can be understood clearly from FIG. 5. The mating elements of the zip fastener, here shown as interengaged teeth carried on the respective wings 16, are indicated by reference numeral 17.

A zippable bag, container or packaging of the invention, inspective of whether it is an FIBC, an RIBC liner, an RIBC cover, a pallet cover or otherwise, is reusable. In particular, whereas prior art heat-shrunk containers are opened by cutting and so become waste, the bags or containers of the invention are opened by unzipping and can be re-used. If necessary, they may be washed between uses.

It will be understood that, in some aspects of the invention, its products do not incorporate zip fasteners. Thus, the feature of an open mouth, in practice positioned at the bottom, enables a flexible bag or container to serve as a reusable pallet cover, since the cover can be removed without being destroyed. However the presence of at least one closable, eg zippable, slit in the cover side wall greatly facilitates placing over a cover over articles on a pallet and it subsequent removed.

It will be appreciated that, whilst the foregoing description has referred specifically to the use of such bags as pallet covers and FIBCs, the applications of the invention are not so limited, and a wide variety of other applications can be envisaged, including in the case of some embodiments various domestic and personal applications such as book carriers, personal effects carriers and the like. Another example of a plastics bag or container of the invention is a bag or cover for accommodating a carpet, particularly a rolled up carpet. In this case the bag will be elongate and formed of sufficiently strong plastics material having regard to the nature of the bag contents.

What is claimed is:

1. A flexible pallet cover of plastic sheet material comprising a polyalkene which is selected from the group consisting of polyethylenes, polypropylenes, polyesters, and combinations thereof, an edge of said cover being attachable to a further edge of said cover by means of a zip fastener, said zip fastener having two elongate flexible wing members made of cross-laminated polyalkene sheet material that is of the same polyalkene as used in said cover, each wing member having two elongate edges, one of said elongate edges carrying a row of teeth for interlocking cooperation with the teeth of the other flexible wing member, the other elongate edge and an elongate portion of the wing member overlapping an edge region of the cover, the wing member and cover being joined by a weld in the region of overlap between said elongate portion and said edge region of the cover.

2. A pallet cover according to claim 1 wherein the plastic sheet material is reinforced.

3. A pallet cover according to claim 1 wherein the plastic sheet material comprises bubble film.

4. A pallet cover according to claim 1 wherein the plastic sheet material is laminated to a plastics or non-plastics material.

5. A pallet cover according to claim 1 wherein the zip fastener is located in a side wall of the cover.

6. A pallet cover according to claim 1 having an open bottom that is adapted for at least partially receiving a pallet.

7. A pallet cover according to claim 1 having at least one releasable fastener member for holding the pallet cover to a pallet, wherein the fastener member includes a strap which has at each end one member of a plural member securing device.

8. A pallet cover according to claim 7 in which said at least one releasable fastener member comprises a plurality of fastening members which in use extend across a vertical surface of the pallet cover to an attachment where they are attached to the pallet.

9. A pallet cover according to claim 1 having at least one releasable strap for holding the pallet cover to a pallet, wherein the strap is formed into a loop at its end.

10. A pallet cover according to claim 1 which has defined therein a portion which in use constitutes a side wall and an opening in the said side wall which in use constitutes an upward slit, wherein the slit is openable and closable by means of the zip fastener and the zip fastener is welded to marginal portions of the pallet cover which form opposed sides of the slit.

11. A pallet cover according to claim 10 wherein there are a plurality of said openings, each disposed to form an upward slit at a corner of a pallet.

12. A pallet cover according to claim 11, wherein there are four said openings.

13. A pallet cover according to claim 1 which comprises bubble film laminated to aluminium foil material.

14. Flexible pallet cover according to claim 1 wherein the cover is a sheet material which comprises a laminated polyethylene material.

15. Flexible pallet cover according to claim 14 wherein the laminated polyethylene material of the cover comprises a bubble film laminated to a metal foil material.

16. Flexible pallet cover according to claim 14 wherein the laminated polyethylene material of the cover is a cross-laminated polyethylene.

17. Flexible pallet cover according to claim 1 wherein the flexible wing members comprise cross-laminated polyethylene and metal foil.

18. Flexible pallet cover according to claim 1 wherein said polyalkene is polyethylene.

19. Flexible pallet cover according to claim 1 wherein said weld that joins the wing member and cover is a continuous weld.

* * * * *

UNITED STATES PATENT AND TRADEMARK OFFICE
CERTIFICATE OF CORRECTION

PATENT NO. : 6,540,085
DATED : April 1, 2003
INVENTOR(S) : Heather J. Davies

It is certified that error appears in the above-identified patent and that said Letters Patent is hereby corrected as shown below:

Column 1,
Line 58, the word "an" should be removed.

Column 2,
Line 3, "comparability" should read -- compatability --.

Signed and Sealed this

Fifth Day of August, 2003

JAMES E. ROGAN
*Director of the United States Patent and Trademark Office*